United States Patent [19]

Miller

[11] Patent Number: 4,727,657
[45] Date of Patent: Mar. 1, 1988

[54] DECLINED BED CONTACTOR

[75] Inventor: Robert E. Miller, Yorba Linda, Calif.

[73] Assignee: Union Oil Company of California, Los Angeles, Calif.

[21] Appl. No.: 868,768

[22] Filed: May 29, 1986

Related U.S. Application Data

[63] Continuation-in-part of Ser. No. 840,844, Mar. 18, 1986, abandoned.

[51] Int. Cl.⁴ .............. C10B 1/02; F27D 5/00
[52] U.S. Cl. .................... 34/182; 34/57 C;
202/99; 202/215; 202/223; 202/266; 422/311;
432/144; 432/249
[58] Field of Search ............. 202/99, 215, 222, 266,
202/129, 262, 214, 223; 201/34, 17; 422/311,
143; 34/57 C, 182; 432/58, 143, 144, 153, 249
253

[56] References Cited

U.S. PATENT DOCUMENTS

| | | | |
|---|---|---|---|
| 1,019,958 | 3/1912 | Hannom et al. | 34/57 C |
| 2,717,867 | 9/1955 | Jewell et al. | 208/127 |
| 3,284,317 | 11/1966 | Jahnig et al. | 201/17 |
| 4,065,361 | 12/1977 | Hanson | 202/117 |
| 4,071,151 | 1/1978 | Farber | 202/262 |
| 4,326,857 | 4/1982 | Kato et al. | 48/210 |
| 4,521,278 | 6/1985 | Kelley et al. | 201/17 |
| 4,545,859 | 10/1985 | Kelley et al. | 201/17 |

FOREIGN PATENT DOCUMENTS 1402543 8/1975 United Kingdom ............ 34/57 C Primary Examiner—Barry S. Richman
Assistant Examiner—Joye L. Woodard
Attorney, Agent, or Firm—Yale S. Finkle; Gregory F. Wirzbicki; Dean Sandford

[57] ABSTRACT

An apparatus for contacting solids with gases, preferably a needle coke preheater, which includes an elongated housing having an entrance and an exit and means for introducing solids into the entrance of the housing. A bed support divides the housing into an upper chamber and a lower chamber and is declined from the horizontal at an angle such that the solids introduced into the entrance of the housing slide down the bed support toward the exit of the housing. The bed support contains a plurality of openings distributed between two solid rectangular borders which serve as the two long parallel sides of the bed support. The openings are sufficiently large so that gases can flow from the lower chamber in contact with the solids and then into the upper chamber. The solid rectangular borders prevent preferential flow of the gases up the walls of the housing by forcing the gases to flow toward the center of the bed support. The apparatus also contains means for introducing gases into the lower chamber of the housing, means for removing gases from the upper chamber of the housing and means for removing solids from the exit of the housing.

13 Claims, 3 Drawing Figures

4,727,657

DECLINED BED CONTACTOR

CROSS-REFERENCE TO RELATED APPLICATIONS

This application is a continuation-in-part of application Ser. No. 840,844, filed in the U.S. Patent and Trademark Office on Mar. 18, 1986, now abandoned.

BACKGROUND OF THE INVENTION

This invention relates to the contacting of solids with gases and is particularly concerned with an apparatus in which particulate solids, such as particles of green needle coke, are passed downwardly on a declined bed support while in contact with a gas, preferably a hot gas.

U.S. Pat. Nos. 4,521,278 and 4,545,859, the disclosures of which are hereby incorporated by reference in their entireties, both disclose processes for producing a high quality calcined needle coke from highly friable green needle coke. In the process disclosed by U.S. Pat. No. 4,521,278, green needle coke is heated at a temperature between 875° F. and 1200° F. for a time sufficient to reduce its friability, and then, without cooling below 500° F., the heated green needle coke is calcined at a temperature above 2000° F. In the process disclosed by U.S. Pat. No. 4,545,859, the green needle coke is heated at a temperature between about 935° F. and about 1100° F. for a time sufficient to reduce its friability, and then, after being cooled to a temperature below 250° F., the needle coke is calcined at a temperature above 2000° F. In both processes the lower temperature heating or precalcination step, as opposed to the higher temperature calcination step, is carried out in a declined bed-type heater.

In the declined bed-type heaters described in U.S. Pat. Nos. 4,521,278 and 4,545,859, the friable green needle coke is preheated prior to calcination by passing the coke down a bed support declined from the horizontal at an angle sufficiently large that the coke gravitates down the bed support at a relatively uniform bed depth while being contacted with hot gases that pass upward through openings in the bed support. Normally, declined bed heaters are very effective gas-solids heat transfer devices. Major problems with heat transfer, however, have recently been unexpectedly encountered in a commercial size declined bed-type heater. These heat transfer problems were found by the present inventor to be caused, at least in part, by the preferential flow of the hot gases along the sidewalls of the heater where the gas does not contact the coke passing down the bed support. This gas bypassing results in maldistribution of the hot gases as they pass through the bed support openings in contact with the particles of green needle coke and thereby makes it difficult to obtain uniform heat transfer to the individual coke particles. The gas bypassing also results in the need to increase the flow of hot gases to reach a given degree of solids heating.

Accordingly, it is one of the objects of the present invention to provide a declined bed-type heating apparatus that can be commercially used to uniformly heat solids such as needle coke without a decrease in heat transfer efficiency caused by the preferential flow of hot gases along the sidewalls of the heating apparatus. This and other objects of the invention will become more apparent in view of the following description of the invention.

SUMMARY OF THE INVENTION

The present invention provides a declined bed gas-solids contacting apparatus which includes an elongated, enclosed housing having an entrance and exit and containing a bed support which divides the housing into an upper and lower chamber. The bed support declines from the horizontal at an angle and extends downwardly from the entrance of the housing to the exit of the housing. The bed support contains a plurality of openings distributed between two solid rectangular borders which serve as the two long parallel sides of the bed support. The openings are sufficiently large so that gases can flow from the lower chamber of the housing into contact with a bed of particulate solids gravitating down the bed support from the entrance to the exit of the housing. The apparatus also contains means for introducing gases into the lower chamber of the housing, means for removing gases from the upper chamber of the housing and means for removing solids from the exit of the housing.

It has been found that the presence of the solid borders on the two long parallel sides of the bed support results in a substantial increase, i.e., between about 10 and 20 percent, in heat transfer from the gases passing through the openings in the bed support to the solids that flow down the bed support. Evidently, this increase in heat transfer is caused by the solid borders preventing a substantial amount of the gases from preferentially flowing along the sidewalls of the housing and thereby avoiding contact with the solids that pass down the bed support. The solid borders force the gases to flow toward the center of the bed support where the gases can pass through the openings in the bed support into contact with the solids. The end result is better gas distribution through the downflowing bed of solids and better heat utilization from the gas.

In a preferred embodiment of the invention, the openings in the bed support are gaps formed by a plurality of rectangular slats attached to the walls of the housing and arranged at decreasing elevations such that the leading long edge of each slat, except for the lowermost slat, overlaps but does not touch the trailing long edge of the slat immediately below. Also, in this embodiment of the invention, the solid rectangular borders which serve as the two long parallel sides of the bed support are steel plates positioned such that one long edge of each plate is flush to a wall of the housing and the underside of each plate rests upon the leading long edges of the slats.

DETAILED DESCRIPTION OF THE INVENTION

The apparatus of the invention can be used in a variety of systems in which particulate solids are passed down a bed support declined from the horizontal while being contacted with gases flowing upwardly through openings in the bed support. Although the apparatus of the invention is particularly useful in a system wherein green needle coke is precalcined or preheated by passing the needle coke down a declined bed support in contact with hot gases, it will be understood that the apparatus of the invention is not limited to such use. For example, the invention can be used in a system wherein coke is calcined at much higher temperatures than typical precalcination temperatures. The invention may also be used to gasify coal in lieu of the apparatus shown in U.S. Pat. No. 4,326,857, the disclosure of which is hereby incorporated by reference in its entirety, or for the coking and distilling of resids as described in U.S. Pat. No. 2,717,867, the disclosure of which is also hereby incorporated by reference in its entirety. In addition to utilizing the apparatus of the invention to heat various types of particulate solids, with or without causing the solids to react with the hot gases with which they are contacted, the apparatus of the invention may also be used to cool solids by passing the solids down the declined bed support in contact with cool gases passed upward through openings in the bed support.

Figure 1:
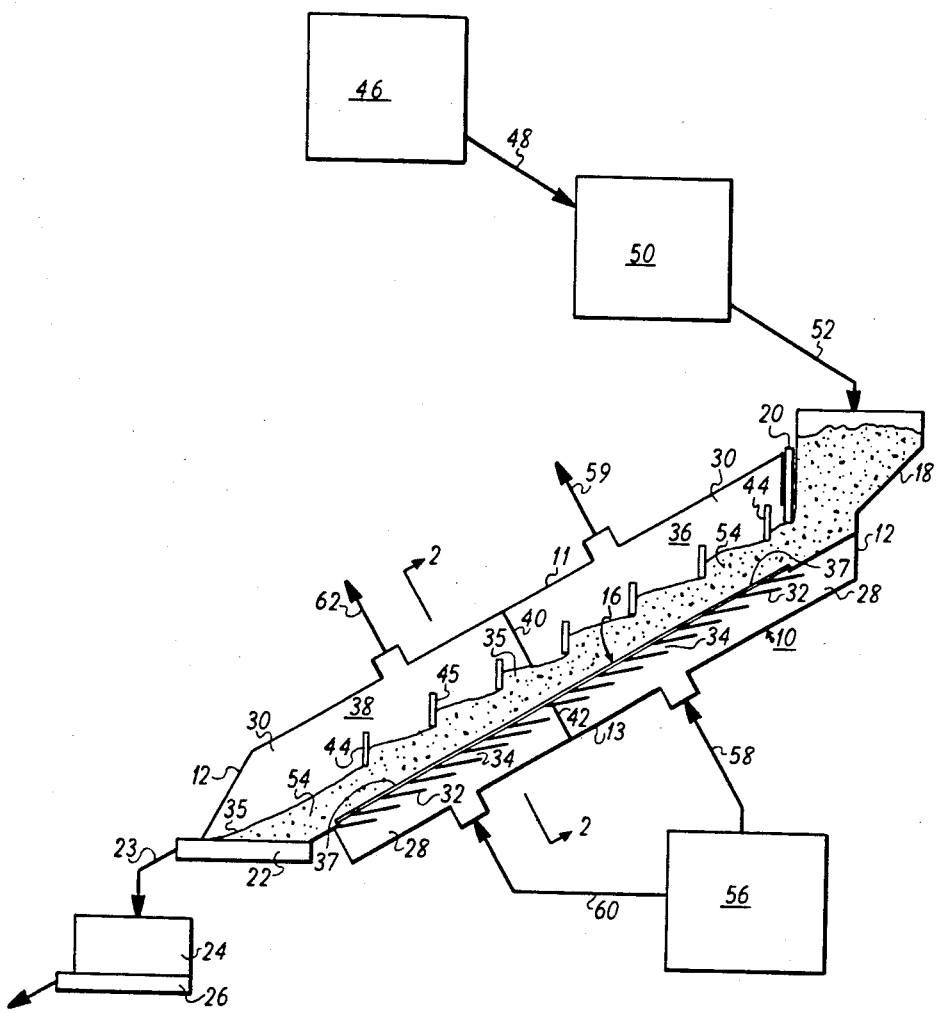
FIG. 1 in the drawing is an elevational view in vertical cross-section showing a preferred embodiment of the apparatus of the invention.
Figure 2:
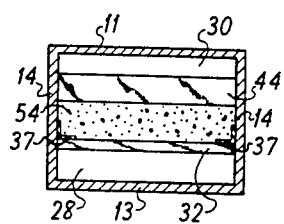
FIG. 2 is a cross-sectional view of the apparatus of the invention shown in FIG. 1 taken on the line 2—2.
Figure 3:
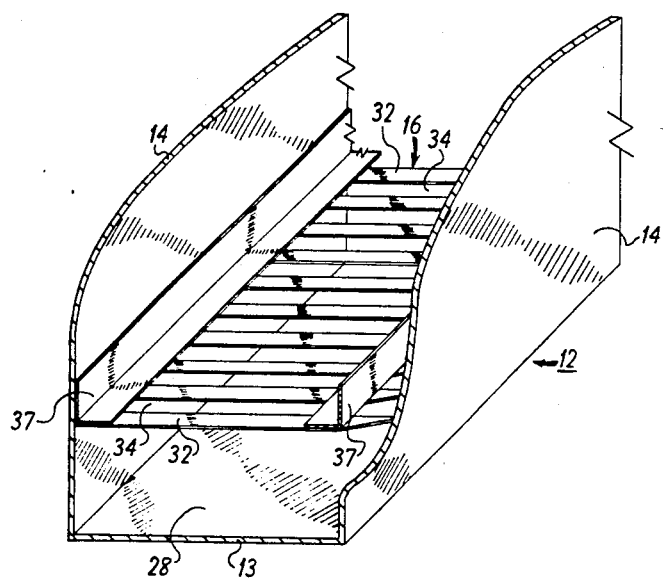
FIG. 3 is an enlarged, cutaway isometric view of a portion of the apparatus of the invention shown in FIG. 1 which illustrates the positioning of the angle irons which comprise the solid rectangular borders of the depicted bed support.

Referring to FIGS. 1, 2 and 3 of the drawing, declined bed heater 10 includes an enclosed housing 12 having sidewalls 14, a top 11 and a bottom 13. The housing is typically fabricated from carbon steel or alloy steel depending on the temperatures encountered in the heater. Normally, the heater is lined with some type of reinforced castable refractory to insulate it from heat loss. The housing is situated at an incline from the horizontal to accommodate declined bed support 16.

A feed hopper 18 communicates with the entrance of housing 12 and contains an adjustable gate 20 which can be either raised or lowered to control the depth of solids flowing down bed support 16. Communicating with the exit of housing 12 is vibrating conveyor 22 which serves to transport hot solids from the exit of housing 12 through conduit 23 into intermediate storage bin 24. Vibrating conveyor 26 communicates with the bottom of intermediate storage bin 24 and is used to convey the solids which accumulate therein from the bottom of the bin to a calciner, not shown in the drawing.

Bed support 16 is declined from the horizontal at an angle which will allow solids to flow down the bed support under the influence of gravity. The angle at which the solids will flow by gravity is normally referred to as the angle of slide of the solids and depends on the nature of the bed support surface and the type and particle size of the solids. The angle of declination must be greater than the angle of slide and is normally sufficiently large to cause the solids to slide down the bed support in substantially a plug flow manner. Typically, the angle of declination of the bed support will range between about 20° and about 40° from the horizontal. The bed support divides the interior of housing 12 into a lower chamber 28 and an upper chamber 30.

The bed support 16 may be any declined surface over which particulate solids can flow and which also contains a plurality of openings distributed between two solid rectangular borders which serve as the two long parallel sides of the bed support. The openings in the bed support allow the passage of gases from lower chamber 28 of housing 12 through the solids flowing down the bed support and into upper chamber 30. The openings must be of a size and/or shape that will substantially prevent the particulate solids from entering the openings and passing into lower chamber 28. The solid borders help to prevent a substantial amount of gases from preferentially flowing up the walls of housing 12 and thereby avoiding contact with the downwardly flowing solids.

In a preferred embodiment of the invention illustrated in FIGS. 1, 2 and 3 of the drawing, bed support 16 is comprised of (1) a plurality of rectangular slats 32 arranged to form openings or gaps 34 and (2) angle irons 37, which serve as the solid rectangular borders. Each slat is characterized by a long leading edge, a long trailing edge and two short edges. As shown in FIG. 3, slats 32 are attached by their short edges to sidewalls 14 of housing 12 at decreasing elevations such that the leading long edge of each slat (except for the lowermost slat) overlaps but does not touch the trailing long edge of the slat immediately below. The slats are arranged so that all the long edges are parallel to the horizontal plane while all the short edges are aligned along a single family of parallel lines, each line of which is declined from the horizontal by an angle slightly less than the net angle of decline for bed support 16 as a whole. Gaps 34, formed by the spaces or openings between adjacent slats, are typically uniform in size so as to allow gases to pass through the gaps without allowing solids flowing down the surface of bed support 16 to migrate through the gaps into lower chamber 28 of housing 12.

The two long parallel sides or solid rectangular borders of bed support 16 are comprised of angle irons 37. As is shown in FIG. 3, one side of each angle iron is attached flush to a wall 14 of housing 12. The other side of the angle iron serves as the solid rectangular border of the bed support. The bottom of this side of the angle iron rests on the leading long edge of slats 32. The solid borders formed by angle irons 37 direct the gases flowing from lower chamber 28 through gaps 34 toward the center of bed support 16 instead of allowing the gases to preferentially flow up the walls 14 of housing 12 as would occur if the gaps 34 extended all the way to the walls. Although FIG. 1 shows that each side of bed support 16 is comprised of one long angle iron 37, it will be understood that a plurality of angle irons may be used instead. If such is the case, the angle irons will be oriented with respect to each other such that the bottom short edge of each angle iron, except for the lowermost angle iron, is flush with or slightly overlaps the top short edge of the adjacent angle iron. An arrangement where the short edges overlap is normally preferred in order to allow for expansion of the angle irons during operation of heater 10.

Although the solid rectangular borders of bed support 16 are shown in the figures and described above as angle irons, any type of a solid rectangular border may be used as long as it serves to direct the flow of gases toward the center of the bed support. For example, the borders could be rectangular steel plates positioned such that the one edge of each plate is flush with a wall 14 of housing 12 and the underside of the plate rests on or is attached to the leading long edge of one or more of the slats 32. Alternatively, bed support 16 may be fabricated from one or more solid steel plates in which the openings are located such that the long parallel sides of the plate contain no openings and thus serve as the solid rectangular borders.

The width of the solid rectangular borders depends primarily on the depth of bed 54 and the particle size of the solids that comprise bed 54. Normally, the width of the border is equal to or greater than the diameter or longest dimension of the largest particles in bed 54 and at least one-half the depth of bed 54. Widths of this size will usually ensure that the gases passing through the openings in bed support 16 will not be able to migrate back to the walls of housing 12 or preferentially pass through areas of high voidage near the heater walls before they exit bed 54 and pass into upper chamber 30. The width of the border will preferably range between about one-half and one times the depth of particle bed 54.

Heater 10 is divided into two sections, a drying section 36 and a heating section 38, by transverse baffles 40 and 42. These baffles are located approximately midway down housing 12 and are attached respectively, to the top 11 and to the bottom 13 of housing 12. Transverse baffle 40 is positioned perpendicular to the top of the housing and extends downwardly to the top surface 35 of the bed of solids 54 flowing down bed support 16 when heater 10 is operating. Transverse baffle 40, however, does not normally extend into bed 54. Transverse baffle 42 extends perpendicularly from the bottom 13 of housing 12 upwardly to slats 32. The transverse baffles allow gases of different temperatures to be introduced, respectively, into drying section 36 and heating section 38 without any substantial flow of these gases from one section to the other.

In addition to transverse baffles 40 and 42, the heater 10 also contains a series of bed leveling baffles 44 attached to sidewalls 14 in upper chamber 30. These baffles are positioned in the upper chamber down the length of bed support 16. The baffles are normally rectangular pieces of metal with the shorter edges being secured to sidewalls 14. Each baffle is positioned such that, when heater 10 is operating, the lower longer edge of each baffle extends up to about 6 inches, preferably between about 1 and about 3 inches, into the top 35 of bed 54 but is spaced between about 6 and about 15 inches from the top surface of bed support 16. The bed leveling baffles serve to maintain bed 54 at a relatively uniform depth as the bed of solids flows down bed support 16 from the entrance to the exit of housing 12. In order to keep the depth of bed 54 relatively constant, it is normally desired that the distance between the top surface of bed support 16 and the bottom edge of each bed leveling baffle be approximately equal.

The bed leveling baffles 44 may be made of any solid material which will resist the temperature in drying section 36 and heating section 38 of heater 10. Carbon steel is normally preferred for the lower temperature drying section while an alloy steel is typically used in the higher temperature heating section. The baffles 44 may be any desired shape as long as they traverse the entire width of housing 12, thereby forcing the solids to flow under the lower edge of each baffle. A flat rectangular plate is normally preferred but other shapes, such an angle irons, may be used. The angle of the upstream side 45 of each baffle with respect to the top 35 of bed 54 is selected to minimize accumulation of solids behind the baffle. The angle will typically range between about 20° and 90°, preferably between about 40° and about 60°. The height of each baffle is set to minimize the amount of solids which flows over the top of the baffle. Typical heights will range between about 2 inches and about 15 inches, preferably between about 6 inches and about 10 inches. Normally, the height of each baffle will be substantially equivalent. The actual height of the baffle will depend upon the spacing between baffles. As the spacing between baffles is decreased, the height that the baffles must be to prevent solids overflow also decreases. The variation in bed depth of the solids as they flow down bed support 16 can be minimized by increasing the number of bed leveling baffles and decreasing the distance between baffles. Normally, a sufficient number of baffles is used so that the distance between baffles measured parallel to the bed support 16 ranges between about 1 and about 8 feet, preferably between about 4 and about 6 feet.

The apparatus of the invention depicted in FIGS. 1 through 3 can be used to heat treat green needle coke prepared in coker 46 via any suitable method. One such method is described in U.S. Pat. No. 4,075,084, the disclosure of which is hereby incorporated by reference in its entirety. Normally, the green needle coke produced in coker 46 is relatively friable as indicated by the coke having a Hardgrove Grindability Index above about 90, typically as high as 120 or even 135. The friable green needle coke particles are passed through conduit 48 into crusher 50 where they are physically reduced in size to particles having a maximum diameter which is normally less than about 6 inches, preferably less than about 4 inches and most preferably between about $\frac{1}{4}$ of an inch and 4 inches.

The crushed green needle coke particles produced in crusher 50 are passed through conduit 52 into feed hopper 18 of heater 10 where they accumulate. From the feed hopper, the coke particles pass under adjustable gate 20 onto bed support 16. The initial depth of the coke particles on the bed support is controlled by either raising or lowering adjustable gate 20, which is normally set so the bed depth is between about 6 and about 15 inches. The coke particles distributed on bed support 16 form coke bed 54 which travels down the bed support under baffles 44 toward the exit of housing 12.

As the needle coke particles pass through the upper section 36 of heater 10, they are dried by contact with warm drying gases generated in heat source 56 and passed into the lower chamber 28 of housing 12 via conduit 58. These warm drying gases pass through gaps 34 in bed support 16 into contact with the downflowing coke particles. The rate of flow of the gases through the gaps is such that the coke particles on bed support 16 are in the form of a fixed bed moving in plug flow and are not fluidized. The warm drying gases are normally at a temperature between about 250° F. and about 850° F., preferably between about 300° F. and about 500° F., and most preferably between about 400° F. and about 450° F. The gases which flow through gaps 34 and permeate coke bed 54 raise the temperature of the needle coke particles in the bed to between about 220° F. and about 660° F., preferably between about 250° F. and about 400° F., most preferably between about 280° F. and about 350° F. The cooled drying gases are removed from upper chamber 30 in drying section 36 via conduit 59, treated to remove contaminants, and either recycled to heat source 56 or discharged into the atmosphere.

As the dried needle coke particles pass by transverse baffle 40 in upper chamber 30 of housing 12, they exit the drying section 36 and enter the heat treating section 38 of heater 10. Here the dried coke particles are contacted with hot gases generated in heat source 56 and passed through conduit 60 into lower chamber 28 of housing 12. These hot gases pass through gaps 34 in bed support 16 and permeate the dry needle coke particles in bed 54. The rate of flow of the gases through the gaps is such that the dried coke particles in the bed remain in the form of a fixed bed moving in plug flow and do not become fluidized. The hot gases generated in heat source 56 will normally be at a temperature between about 935° F. and about 1950° F., preferably between about 1000° F. and 1500° F., and most preferably between about 1100° F. and about 1300° F. Contact of the needle coke particles with gases of this temperature will normally result in the coke particles being heated in heat treating section 38 to between about 935° F. and about 1100° F., preferably between about 950° F. and about 1050° F., and most preferably between about 975° F. and about 1025° F. Cooled gases are removed from upper chamber 30 of heat treating section 38 through conduit 62, treated to remove contaminants, including entrained volatile combustible material, and then recycled to heat source 56 or discharged into the atmosphere.

Heat source 56 may be any apparatus capable of generating a steady flow of warm and hot gases. Normally, the heat source will be a combustor of hydrocarbon fuel such as a natural gas burner. The drying gas generated in heat source 56 can be any gas or gas mixture which is substantially inert with respect to the needle coke particles or other solids being heated. Typically, these gases will be combustion product gases comprising nitrogen, carbon dioxide and steam. The oxygen concentration of the drying and heat treating gases is normally less than about 5 volume percent, preferably less than about 2 volume percent and most preferably less than about 0.5 volume percent.

The flow rate of bed 54 in drying section 36 and heat treating section 38 of heater 10 is selected to yield the desired residence time of the coke bed within each of these two sections. The residence time is typically selected so as to effect at least some reduction in the friability of the green needle coke. For highly friable green needle coke, it is normally desired to lower the Hardgrove Grindability Index to below 100, more preferably to below 85 and most preferably to below about 70.

Needle coke that has been completely heat treated passes from the exit of housing 12 onto vibrating conveyor 22, through conduit 23 and into intermediate storage bin 24. The coke is then passed downstream by vibrating conveyor 26 to a calciner, not shown, where the needle coke is calcined at temperatures above about 2000° F. to produce a high quality needle coke having a high bulk density and a low coefficient of thermal expansion when graphitized.

It has been found that during the operation of a heater similar to heater 10 but not having a bed support containing solid rectangular borders as the two long parallel sides, the heat transfer from the hot gases to the downwardly flowing coke bed is inefficient and that greater than design gas flows must be used to heat the coke to desired temperatures. The inefficient heat transfer is apparently caused by the preferential flow of the hot gases up the walls of the heater instead of through coke bed 54. It is felt that the large size of the coke particles contribute to this preferential flow by providing a higher bed voidage at the walls of the heater. This preferential flow of gases results in non-uniform heating of the needle coke particles to produce heat treated needle coke of varying properties.

It has been found that the heat transfer efficiency from the hot gases to the coke can be increased between 10 and 20 percent by providing the two long parallel sides of bed support 16 with solid rectangular borders such as angle irons 37. As described earlier, these solid borders direct the flow of hot gases from near the walls 12 of the heater toward the center of bed support 16 and coke bed 54, thereby preventing substantial wall channeling of the gases. The width of the rectangular borders may vary between about 2 and about 12 inches depending on the depth of coke bed 54 and the size of the larger coke particles. It has been found that a width between about 6 and 10 inches results in a substantial increase in heat transfer efficiency when the top size of the coke particles is about 4 inches and the bed depth of the downflowing coke is about 10 inches.

It will be apparent from the foregoing that the apparatus of the invention provides a relatively simple system for controlling the heat transfer efficiency in a declined bed gas-solids contactor. Utilization of such an apparatus results in the uniform contacting of the solids in the bed with the gases to produce particles of uniform properties.

Although the invention has been primarily described in conjunction with a preferred embodiment, it is evident that many alternatives, modifications and variations will be apparent to those skilled in the art in light of the foregoing description. Accordingly, it is intended to embrace within the invention all such alternatives, modifications and variations that fall within the spirit and scope of the appended claims.

I claim:

1. An apparatus for contacting solids with gases which comprises:
   (a) an elongated and enclosed housing having sidewalls, a top wall, a bottom wall, an entrance end and an exit end for solids;
   (b) a bed support dividing said housing into an upper chamber and a lower chamber and having a longitudinal axis declined from the horizontal at an angle such that solids introduced into the entrance end of said housing flow down said bed support toward the exit end of said housing, said bed support comprising means extending between and attached to the sidewalls of said housing and defining a solids flow surface having a plurality of openings therein, said openings distributed between two solid rectangular borders oriented parallel to said longitudinal axis, which borders define two long parallel sides of said bed support, wherein said openings are large enough to allow gas flow from said lower chamber into said upper chamber, and wherein said solid rectangular borders rest on top of said means defining a solids flow surface such that one long edge of each border is attached flush to a sidewall of said housing;
   (c) means for introducing gases into said lower chamber; and
   (d) means for removing gases from said upper chamber.

2. An apparatus as defined by claim 1 wherein said means defining a solids flow surface comprises a plurality of rectangular slats attached to the sidewalls of said housing, each of said slats having a leading long edge and a trailing long edge, and wherein said slats are arranged at decreasing elevations such that the leading long edge of each slat, except for the lowermost slat, overlaps but does not touch the trailing long edge of the slat immediately below, thereby forming a series of gaps, and wherein said solid rectangular borders comprise steel plates, each of said steel plates comprising two long edges, a top side and a bottom side, positioned perpendicular to said slats such that one long edge of each plate is attached flush to a sidewall of said housing and the bottom side of each plate rests upon the leading long edges of said slats.

3. An apparatus as defined by claim 1 wherein said apparatus further comprises a plurality of baffles attached to the sidewalls of said housing in said upper chamber and arranged down the length of said sidewalls such that the lower edge of each baffle is spaced between about 6 and about 15 inches above said bed support.

4. An apparatus as defined by claim 3 wherein said baffles are rectangular in shape.

5. An apparatus as defined by claim 1 further comprising means for introducing solids into the entrance end of said housing and means for removing solids from the exit end of said housing.

6. An apparatus as defined by claim 5 wherein said means for introducing solids into said entrance end of said housing comprises an adjustable gate.

7. An apparatus as defined by claim 1 wherein said solid rectangular borders are between about 2 and 12 inches in width.

8. An apparatus as defined by claim 2 wherein said steel plates are between about 6 and 10 inches in width.

9. An apparatus as defined by claim 2 wherein said apparatus further comprises a plurality of baffles attached to the sidewalls of said housing in said upper chamber and arranged down the length of said sidewalls such that the lower edge of each baffle is spaced between about 6 and about 15 inches above said bed support.

10. An apparatus for contacting solids with gases which comprises:
   (a) an elongated and enclosed housing having sidewalls, a top wall, a bottom wall, an entrance end and an exit end for solids;
   (b) a bed support dividing said housing into an upper chamber and a lower chamber and having a longitudinal axis delined from the horizontal at an angle such that solids introduced into the entrance end of said housing flow down said bed support toward the exit end of said housing, said bed support comprising (1) a plurality of rectangular slats extending between and attached to the sidewalls of said housing, each of said slats having a leading long edge and a trailing long edge, wherein said slats are arranged at decreasing elevations such that the leading long edge of each slat, except for the lowermost slat, overlaps but does not touch the trailing long edge of the slat immediately below, thereby forming a series of gaps to allow gas flow from said lower chamber into said upper chamber, and (2) two solid rectangular steel plates, each of said plates having two long edges, a top side and a bottom side, positioned perpendicular to said slats and oriented parallel to said axis such that one long edge of each plate is attached flush to a sidewall of said housing and the bottom side of said plates rest upon the leading long edges of said slats, said steel plates defining two long parallel sides of said bed support;
   (c) means for introducing gases into said lower chamber;
   (d) means for removing gases from said upper chamber; and
   (e) vibrating means communicating with the exit of said housing for removing solids from said housing.

11. An apparatus as defined by claim 10 further comprising means for introducing said solids into the entrance end of said housing.

12. An apparatus as defined by claim 11 wherein said vibrating means comprises a vibrating conveyor.

13. An apparatus as defined by claim 10 wherein the width of said steel plates is between about 6 inches and about 10 inches.

* * * * *